United States Patent [19]
Washisu

[11] Patent Number: 5,608,703
[45] Date of Patent: Mar. 4, 1997

[54] IMAGE BLUR PREVENTION APPARATUS

[75] Inventor: Koichi Washisu, Tokyo, Japan

[73] Assignee: Canon Kabushiki Kaisha, Tokyo, Japan

[21] Appl. No.: 576,134

[22] Filed: Dec. 21, 1995

[30] Foreign Application Priority Data

Dec. 26, 1994 [JP] Japan ................................. 6-322406

[51] Int. Cl.$^6$ ...................................................... G03B 5/00
[52] U.S. Cl. ............................................................. 369/55
[58] Field of Search ................................... 354/430, 202; 348/208

[56] References Cited

U.S. PATENT DOCUMENTS

| | | | |
|---|---|---|---|
| 4,965,619 | 10/1990 | Shikaumi et al. ...................... | 354/410 |
| 5,020,369 | 6/1991 | Washisu et al. ....................... | 73/517 A |
| 5,231,445 | 7/1993 | Onuki et al. .......................... | 354/430 X |
| 5,541,693 | 7/1996 | Enomoto et al. ...................... | 354/202 |

*Primary Examiner*—W. B. Perkey
*Attorney, Agent, or Firm*—Fitzpatrick, Cella, Harper & Scinto

[57] ABSTRACT

An apparatus includes a control unit for switching image blur prevention operations between a first image blur prevention operation and a second image blur prevention operation with respect to the same image blur state in accordance with a start of a photographing operation. For example, the control unit performs control to switch modes between a mode of performing a prevention operation by an operation amount required to attain correction, and a mode of performing a prevention operation by an operation amount smaller than the required operation amount to leave room for correction. This switching operation is performed independently of an image blur frequency. For example, a gain is evenly changed at all frequencies. With this arrangement, the operability of the apparatus can be improved.

11 Claims, 18 Drawing Sheets

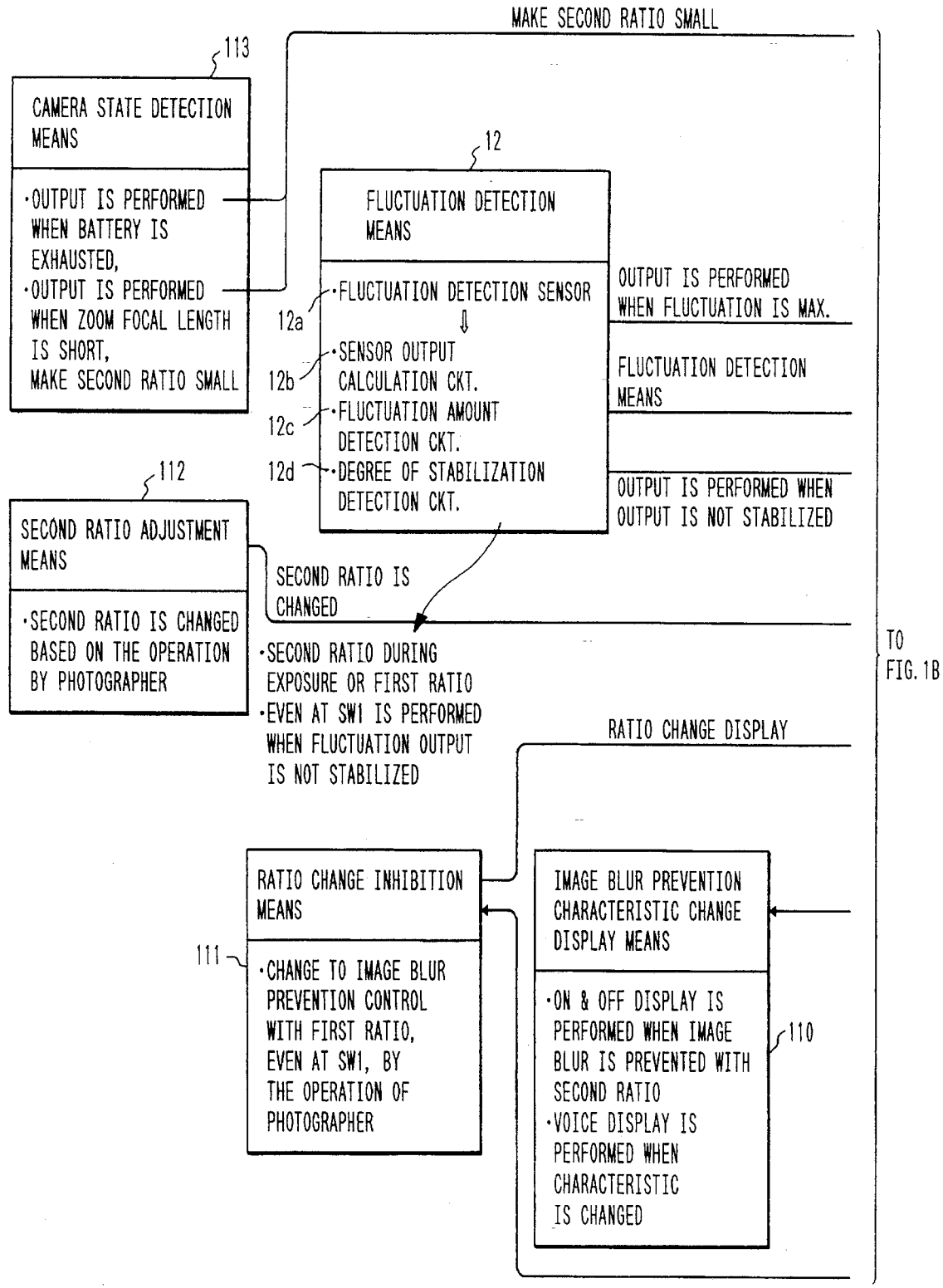

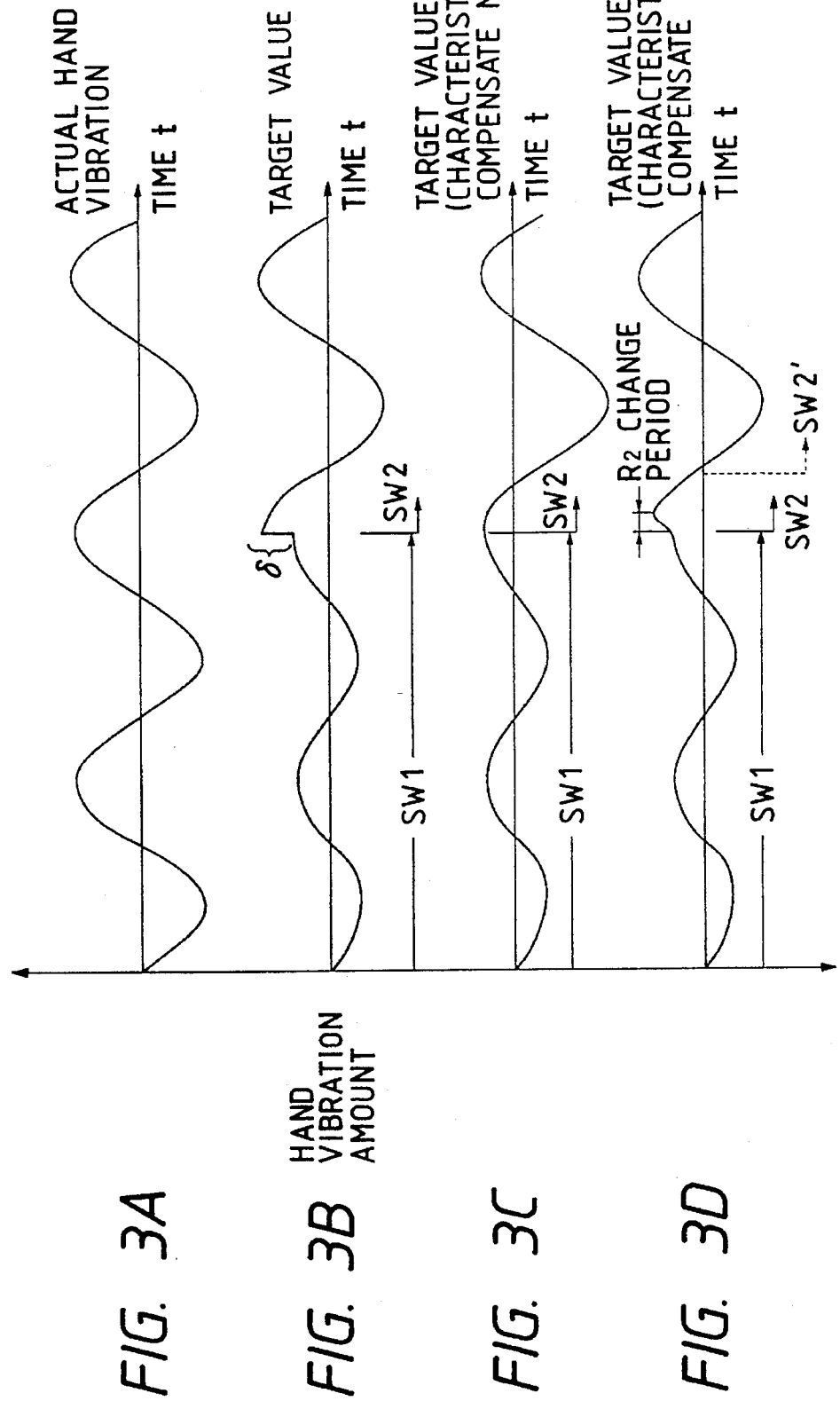

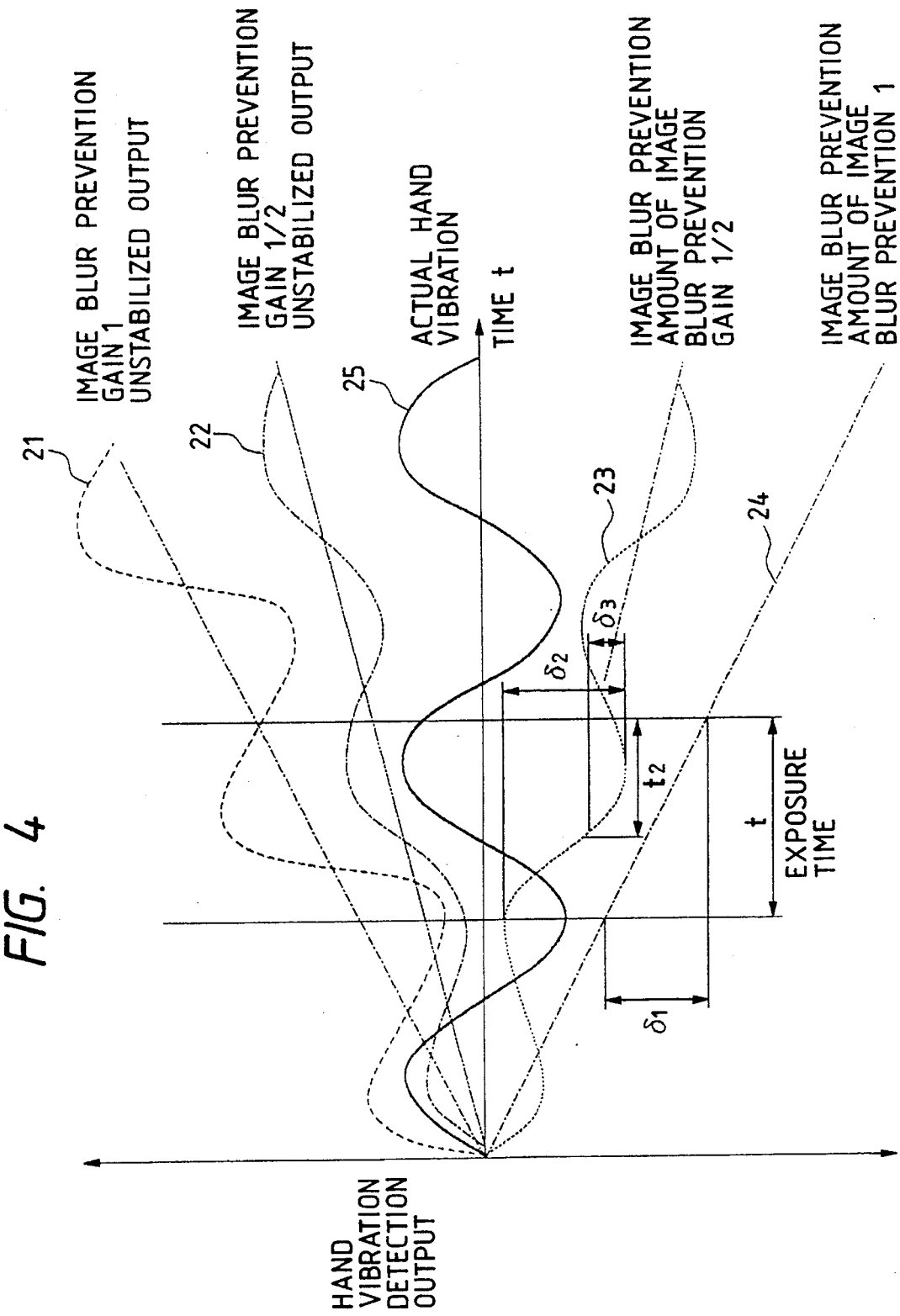

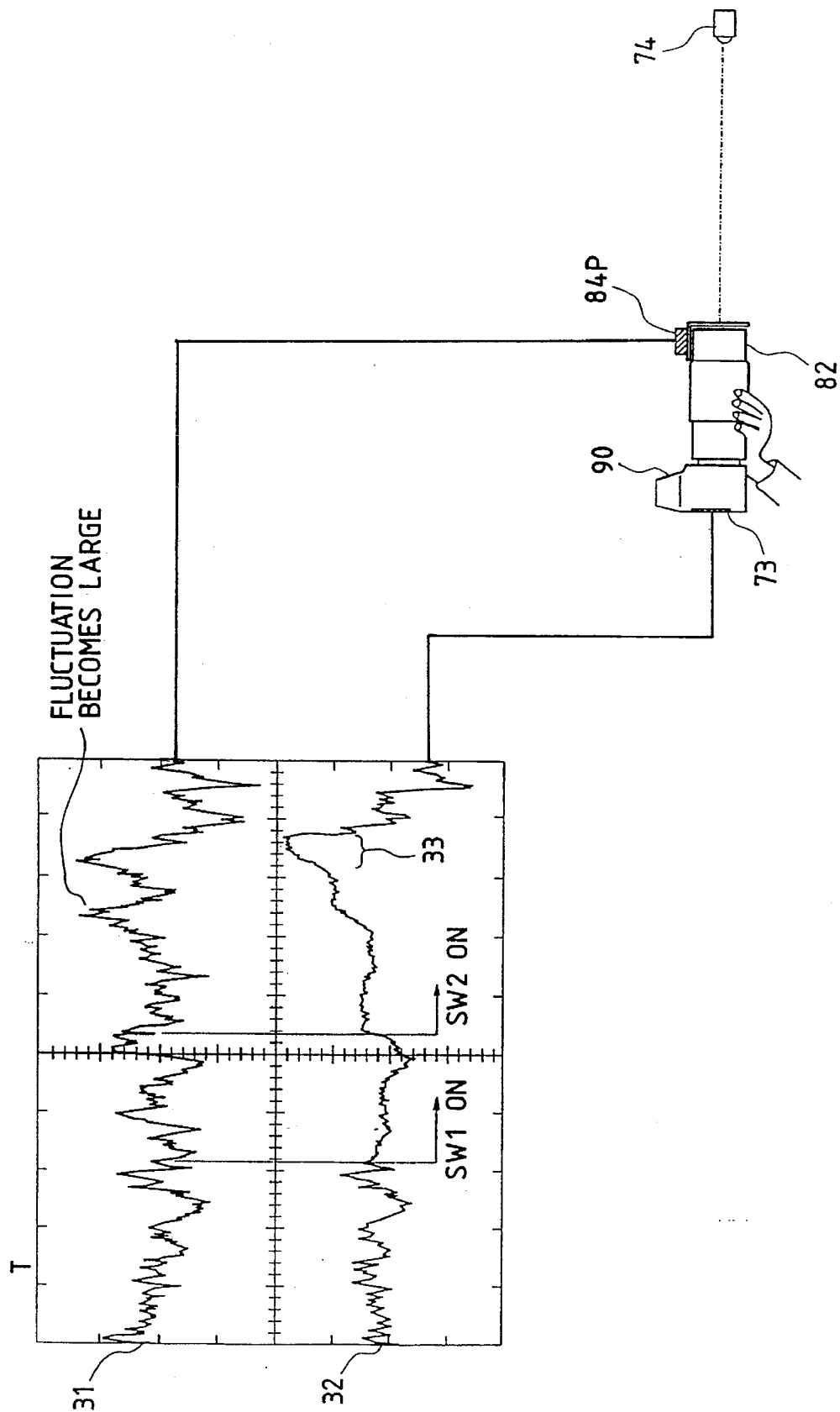

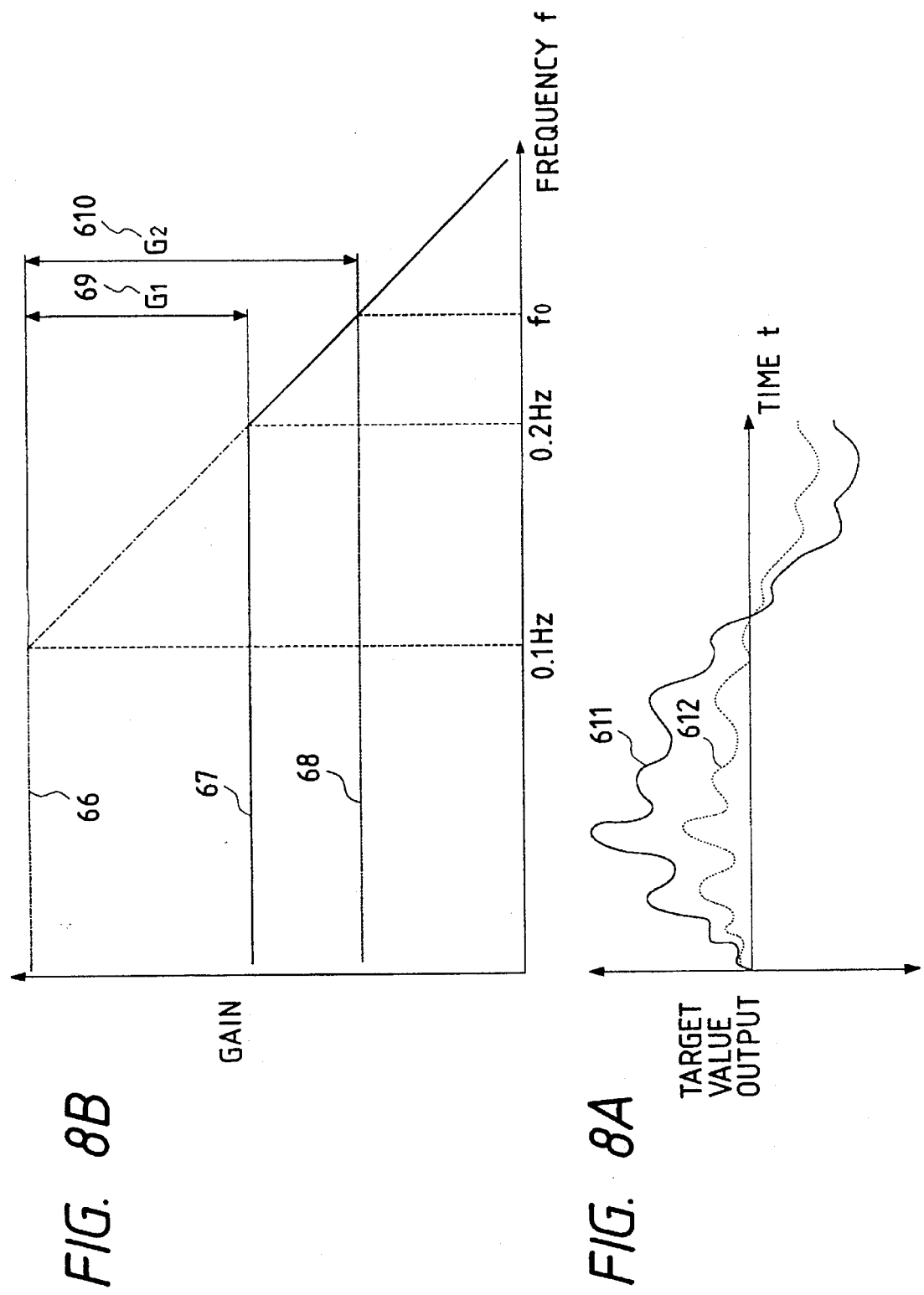

IMAGE BLUR PREVENTION APPARATUS

BACKGROUND OF THE INVENTION

1. Field of the Invention

The present invention relates to an image blur prevention apparatus for preventing an image blur caused by hand vibration (fluctuation) or the like in a camera, optical equipment, or the like.

2. Related Background Art

In currently available cameras, all operations important to a photographer, e.g., exposure and focus control, are automatically determined. Therefore, even an unskilled user rarely fails in a photographing operation because of automatic determination of exposure or focus control. However, it is difficult to automatically prevent a failure in photographing owing to camera vibration (fluctuation). Recently, a camera capable of preventing a failure in photographing owing to hand vibration of a photographer has been enthusiastically studied. A camera designed to prevent a failure in photographing owing to hand vibration of a photographer, in particular, has been developed and studied.

In general, hand vibration of the photographer using the camera in a photographing operation falls within vibrations (fluctuations) of 1 Hz to 12 Hz. According to a basic concept of taking a picture without any image blur even with hand vibration at the time of a shutter release operation of the camera, camera vibration caused by the above hand vibration is detected, and an image blur is corrected by displacing a correction lens in accordance with the detection value. In order to achieve the above object (i.e., to take a picture without any image blur even with camera vibration), first of all, camera vibration must be accurately detected to correct a change in optical axis due to hand vibration.

In principle, this vibration (camera vibration) can be detected by mounting a vibration sensor and a camera vibration detection system in a camera. The vibration sensor detects an angular displacement, an angular acceleration, an angular velocity, and the like. The camera vibration detection system electrically or mechanically integrates the sensor signal to output an angular displacement. Image blur suppression is then performed by driving a correction optical mechanism for offsetting the photographic optical axis on the basis of the detection information. An image blur suppression system using an angular displacement detection unit will be briefly described below with reference to FIG. 12. This system is designed to suppress an image blur caused by vertical camera vibration (fluctuation) 81$p$ and lateral camera vibration (fluctuation) 81$y$ in directions 81 indicated by the arrows in FIG. 12. Referring to FIG. 12, the system includes a lens barrel 82, and vibration detection system units 83$p$ and 83$y$ for respectively detecting a vertical camera vibration and a lateral camera vibration in angular displacement detecting directions 84$p$ and 84$y$. The system also includes a correction optical means 85 (coils 86$p$ and 86$y$ for giving a thrust to the correction optical means, and position detection sensors 87$p$ and 87$y$ for detecting the position of the correction optical means). The correction optical means 85 has a position control loop to be described later. The correction optical means 85 is driven in accordance with outputs from the angular displacement detection means 83$p$ and 83$y$ as target values, thereby stabilizing an image surface 88.

When photographing operations were actually performed using this image blur prevention system, it was found that the characteristics of hand vibration in an image blur prevention mode were different from those in a non-image blur prevention mode.

For example, the swing of the body of a person is larger when he/she stands with his/her eyes being closed than when he/she stands with his/her eyes being open. This is because changes in surroundings due to the swing of the body are not input when the person stands with his/her eyes being closed. The image blur prevention mode creates a state similar to the above state in which no changes are input. For this reason, the swing of the body becomes larger than that in the non-image blur prevention mode.

Referring to FIG. 11, the above phenomenon is proved by actual measurement. A two-dimensional PSD 73 (optical position detection means) for measuring an image blur amount is mounted on the image surface of a camera 90. When a user aims the camera 90 at an IRED 74 (projector) as a target, the image blur amount of the image surface of the camera 90 is outputted (an actual measurement 71).

A fluctuation (vibration) detection means (angular velocity meter 84$p$) on a image blur prevention lens 82 outputs actual hand vibration 72 (a value obtained by integrating the output from the angular velocity meter 84$p$ and converting it into a hand vibration angle).

Referring to FIG. 11, when the image blur prevention system is not operated (see the left half of the drawing), an output 71 coincides with the output 72. As is apparent, this is because the image blur amount of the image surface is equal to the hand vibration angle. When the image blur prevention system is started (see the right half of the drawing, i.e., the right side of "ISON"), the image blur 71 of the image surface (this output is ideally represented by a straight line without any blur) includes fluctuation. Although the image blur amount is considerably reduced by ISON, this image blur reducing effect is not sufficient for a picture without any blur. As described above, this is because the characteristics of hand vibration change in the image blur prevention mode, and large fluctuation having a low frequency appears (75). For this reason, sufficient image blur prevention cannot be performed (fluctuation 76). There are two reasons why large fluctuation having a low frequency cannot be sufficiently prevented. First, the fluctuation detection means cannot accurately detect low frequency fluctuation. In this system, a hand vibration angle is obtained by integrating a hand vibration angular velocity output. In order to accurately integrate a hand vibration band (1 to 12 Hz), the band of the integrator must be broadened to a band of 0.1 to 120 Hz. When the hand vibration band changes to a band of 0.2 to 12 Hz in the image blur prevention mode, the integration band must also be broadened to a band of, e.g., 0.02 to 120 Hz. However, when the integrator is made to respond in a low frequency band of 0.02 Hz, the stability of the integrator (starting characteristics and error output characteristics) is greatly degraded. This method is therefore not practical. For this reason, even if a hand vibration band is broadened to the low frequency side in the image blur prevention mode, the integration band cannot be broadened. As a result, an integration error occurs, and hand vibration cannot be accurately detected. Second, in the image blur prevention mode, the actual hand vibration amount increases, and hence the driving stroke of the correction optical means for performing blur correction becomes too short for correction. As a result, the correction optical means does not accurately follow an output from the fluctuation detection means, leading to degradation in image blur prevention precision. This problem can be solved by increasing the driving stroke of the correction optical means. This, however, poses another problem, i.e., an increase in the size and weight of the image blur prevention system.

As described above, degradation in image blur prevention precision is caused by a change in hand vibration characteristics in the image blur prevention mode. In addition, even if a photographer tries to determine a composition by making a fine framing change in the image blur prevention mode, a change in the posture of the camera, which is made for a framing change, is corrected by the correction optical means. For this reason, a framing change cannot be performed quickly and accurately.

SUMMARY OF THE INVENTION

According to one aspect of the invention, an apparatus includes a control unit for performing control to switch operations between a first image blur prevention operation and a second image blur prevention operation with respect to the same image blur state in accordance with a start of a photographing operation, the control unit switching the operations independently of an image blur frequency, thereby improving the operability of the apparatus.

BRIEF DESCRIPTION OF THE DRAWINGS

FIGS. 3A to 3D are graphs for explaining the operation characteristics of the arrangement of the first embodiment of the present invention;

FIG. 4 is a view for explaining the operation characteristics of the arrangement of the first embodiment of the present invention;

FIG. 5 is a graph for explaining the effect obtained by the arrangement of the first embodiment of the present invention;

FIGS. 8A and 8B are graphs for explaining the operation characteristics of the second embodiment of the present invention;

DETAILED DESCRIPTION OF THE PREFERRED EMBODIMENTS

[First Embodiment]

Figure 1B:
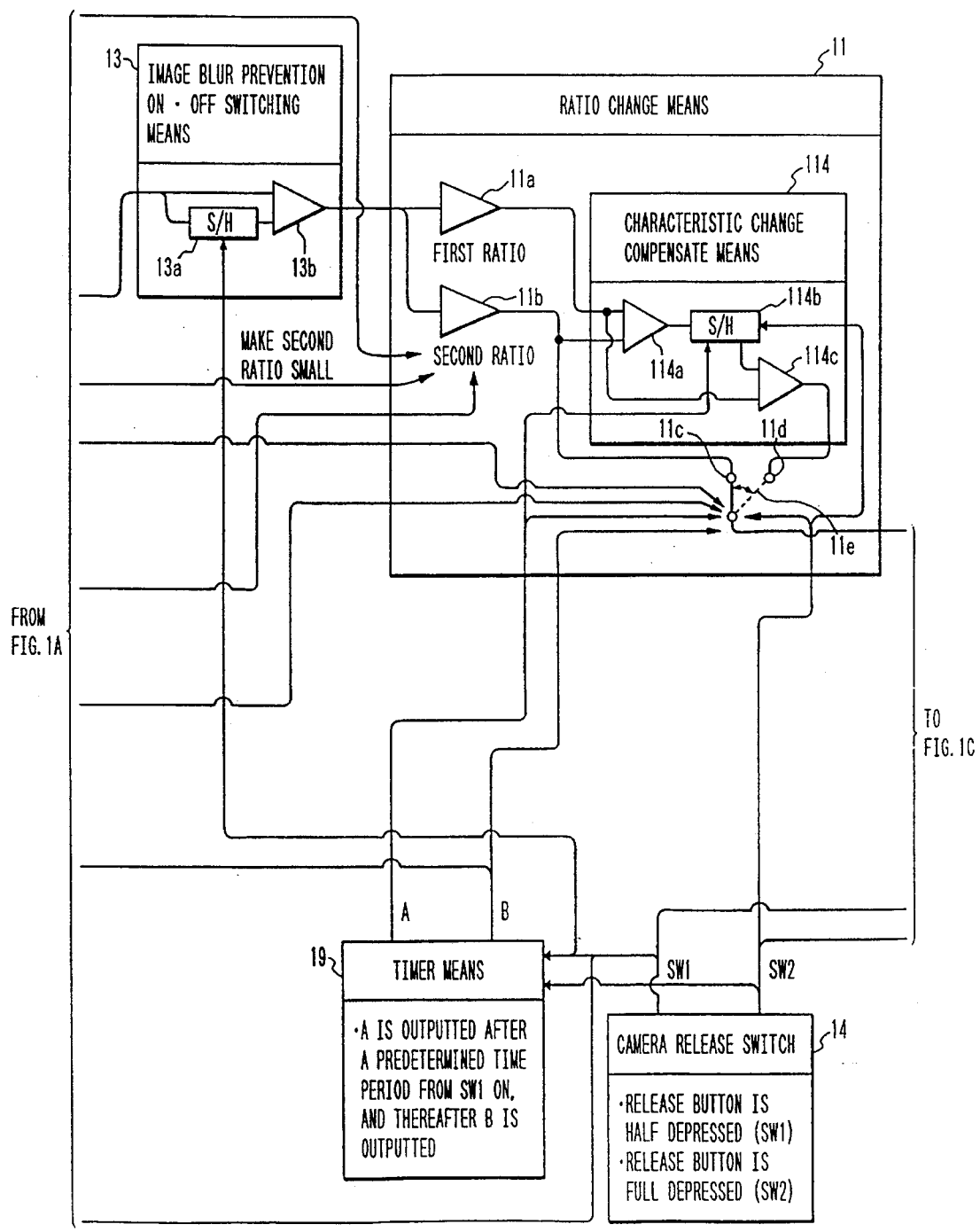
FIG. 1 is comprised of FIGS. 1A, 1B and 1C illustrating block diagrams showing the schematic arrangement of the first embodiment of the present invention.
Figure 1C:
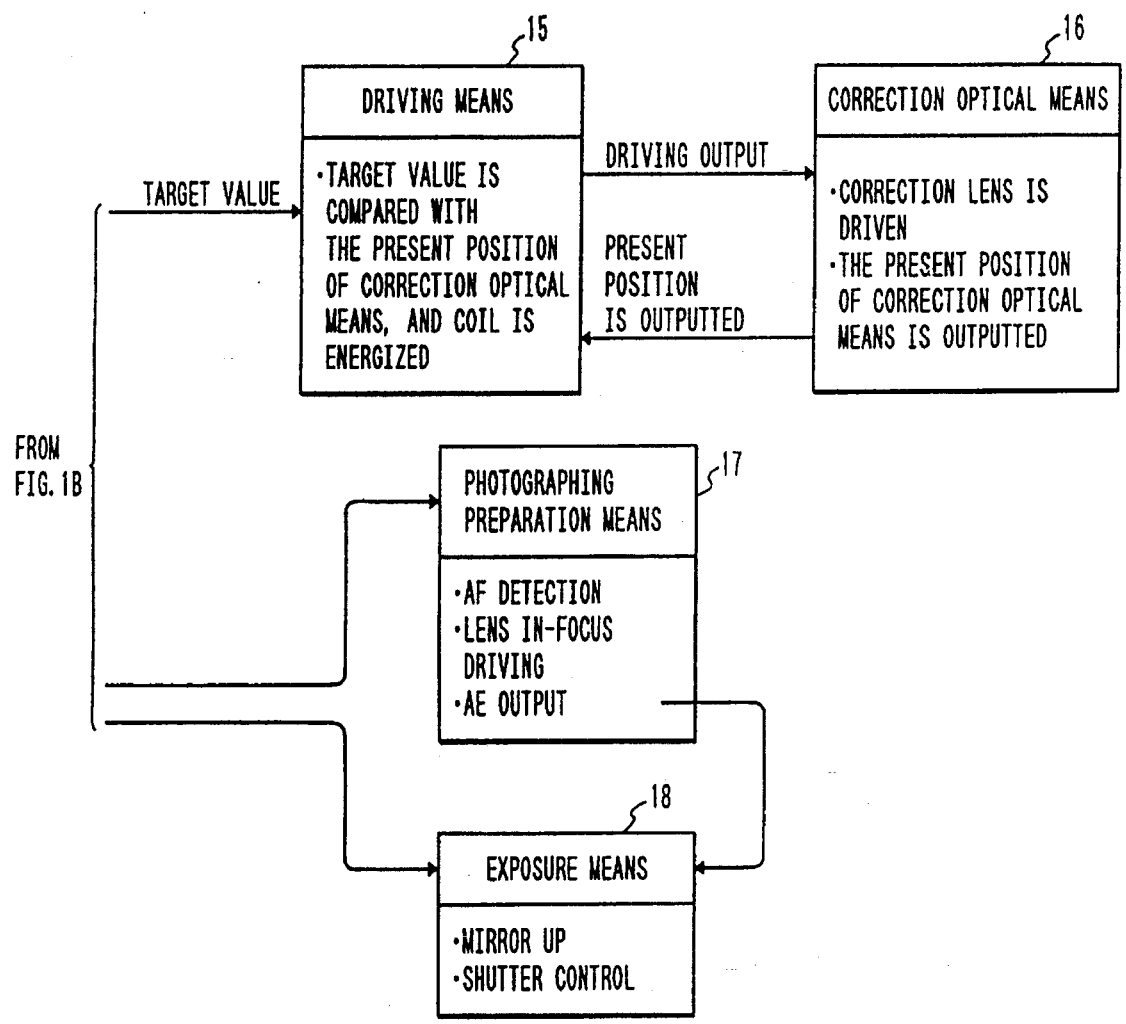

FIGS. 1A to 1C are block diagrams showing the arrangement of a camera having an image blur prevention function according to the first embodiment of the present invention.

The components of this arrangement will be sequentially described below in accordance with a sequence of photographing operations using the camera.

First of all, the photographer aims the camera at an object to be photographed, and half-depresses a release switch 14 to output a signal SW1. The signal SW1 is inputted to a photographing preparation means 17 to perform distance measurement (AF detection), photometry (AE output), and autofocus control (lens in-focus driving).

The signal SW1 is also inputted to an image blur prevention ON-OFF switching means 13 to set a sample/hold circuit 13a in the hold mode. A hand vibration angle displacement output (sensor output calculation circuit 12b) obtained by integrating an angular velocity meter output (fluctuation detection sensor 12a) from a fluctuation detection means 12 is inputted to the sample/hold circuit 13a and a differential circuit 13b. When the sample/hold circuit 13a is in the sample mode, since identical signals are inputted to the two input terminals of the differential circuit 13b, the output is zero. However, when the sample/hold circuit 13a is set in the hold mode, the differential circuit 13b starts to output a fluctuation signal with the output from the fluctuation detection means 12 at the time of mode switching being considered as a reference point (0 output) after the mode switching.

That is, since a target value inputted to a driving means 15 is always 0 at first, a correction optical means 16 stands still at the center of the lens. However, as the above target value becomes the fluctuation signal corresponding to the detection output from the fluctuation detection means 12, the correction optical means 16 starts to move from the center of the lens in accordance with the change in the target value, thereby starting image blur prevention.

Assume that the image blur prevention ON-OFF switching means 13 does not include the differential circuit 13b, and the target value from the fluctuation detection means 12 is directly inputted to the driving means 15 with the signal SW1 to drive the correction optical means 16. In this case, since the correction optical means 16 is quickly moved to a position corresponding to the target value, the framing abruptly changes to make the photographer, who is looking into the finder, feel uncomfortable. Such an inconvenience can be prevented by the following arrangement.

An output from the image blur prevention ON-OFF switching means 13 is inputted to a ratio change means 11. The ratio change means 11 includes a first amplification circuit 11a for amplifying the output from the image blur prevention ON-OFF switching means 13 with a first ratio, and a second amplification circuit 11b for amplifying the output with a second ratio. The first ratio is set to be a gain which makes an image blur displacement amount based on camera vibration coincide with the correction amount of an image corrected by driving the correction optical means 16 in accordance with a blur signal (image blur correction is accurately performed). The second ratio is set to be a gain lower than the first ratio. That is, the second ratio is set to be a gain which makes the correction amount of the image corrected by driving the correction optical means 16 smaller than the image blur displacement amount based on the camera vibration (correction is performed insufficiently).

With the above arrangement, the gain evenly changes throughout all the frequencies of the input signal.

The signal SW1 from the release switch 14 is also inputted to a timer means 19. The timer means 19 keeps outputting a signal A for a predetermined time period (about two seconds) since the signal SW1 was inputted, and outputs a signal B after the lapse of a predetermined time period.

The signal A is inputted to a sample/hold circuit 114b of a characteristic change compensate means 114 to cause the image blur prevention ON-OFF switching means 13 to set the sample/hold circuit 114b in the hold mode. Since both the outputs from the first and second amplification circuits 11a and 11b are zero, a differential circuit 114a outputs a 0 output. The sample/hold circuit 114b holds this 0 output. A differential circuit 114c outputs the difference between the 0 output and the output from the first amplification circuit 11a. This output from the differential circuit 114c is identical to the output from the amplification circuit 11a. This output is inputted, as a target value, from a terminal 11d to the driving means 15 through a switch 11e (when the signal A is outputted from the timer means 19, the signal A is inputted to the switch 11e to connect it to the terminal 11d). The driving means 15 then drives the correction optical means 16 to follow the target value, thereby sufficiently performing image blur prevention.

When the above predetermined time period elapses after the signal SW1 is outputted (about two seconds elapse after image blur prevention is started), hand vibration characteristics change, as described above, (the photographer's body starts to swing). In order to cope with such a state, the timer means 19 outputs the signal B instead of the signal A.

As a result, the sample/hold circuit 114b is set in the sample mode (because the signal A is not inputted), and the signal B is inputted to the switch 11e to connect it to a terminal 11c so as to input an output from the second amplification circuit 11b, as a target value, to the driving means 15.

Note that the correction optical means 16 may be driven in accordance with a signal amplified by the second amplification circuit 11a with the second gain (insufficient correction is performed) immediately after SW1 is turned on. In this embodiment, however, in order to emphatically show the difference between images with and without the image blur prevention function before and after SW1 ON, or prevent difficulty in distance measurement because of hand vibration, the correction optical means 16 is driven in accordance with a signal amplified by the second first amplification circuit 11a with the first gain (proper correction is performed) in an early stage after SW1 is turned on.

The signal B is also inputted to an image blur prevention characteristic change display means 110 to perform ON and OFF display or voice display of a change in the image blur prevention characteristics in the finder.

As described above, when the correction optical means 16 is driven in accordance with a signal amplified with the second gain, insufficient image blur prevention is performed, and the image blur prevention effect is not sufficient. Owing to this driving mode, however, a finer framing change can be allowed (in the driving mode based on a signal amplified with the first gain, even a motion associated with a framing change is corrected, the framing is difficult to change). This display notifies the photographer of not only a change in the image blur prevention characteristics but also permission of a framing change.

Figures 2A, 2B:
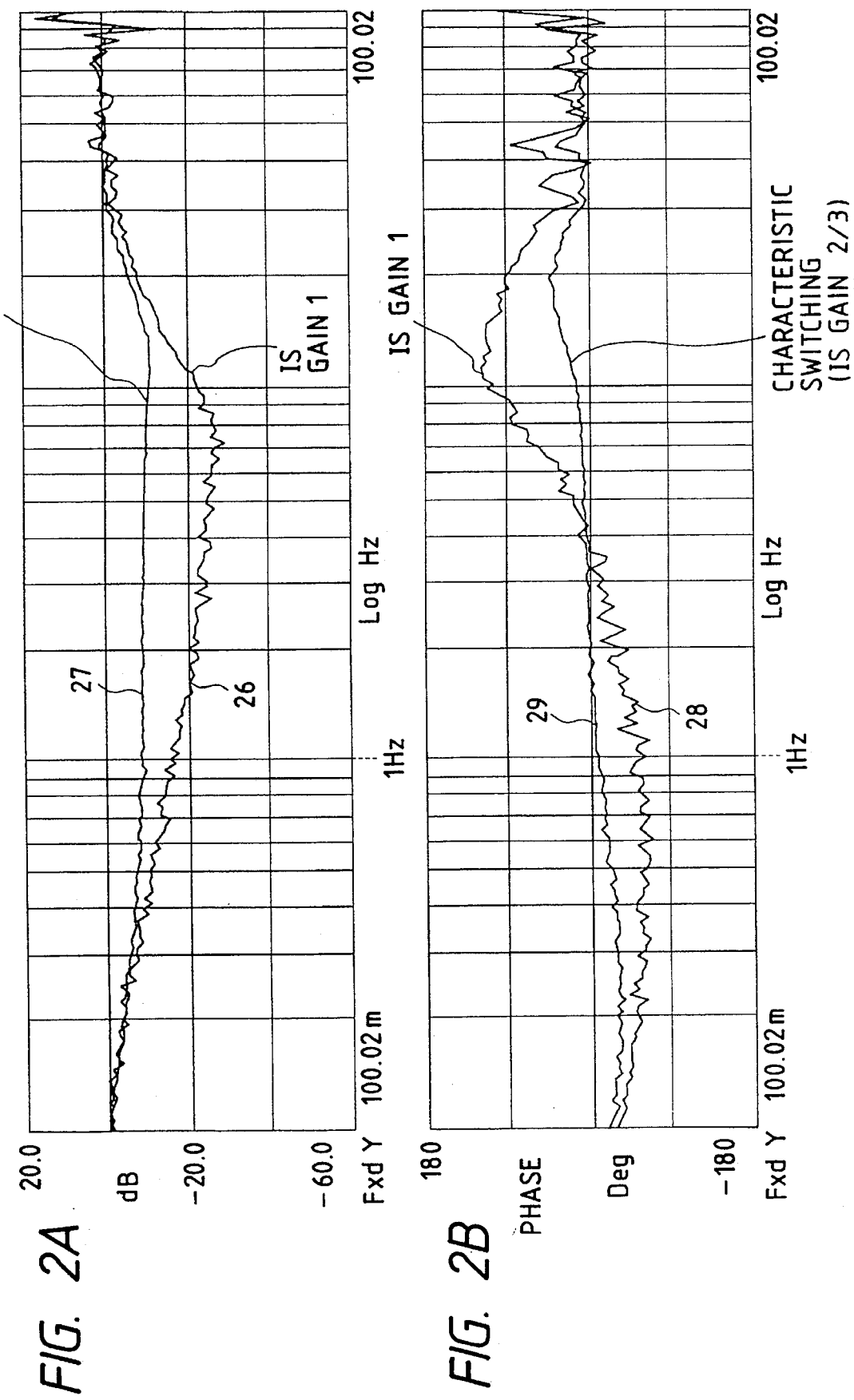
FIGS. 2A and 2B are graphs for explaining the operation characteristics of the arrangement of the first embodiment of the present invention.

When the correction optical means 16 is driven in accordance with a signal amplified with the second gain, a framing change is easy to make. This operation will be described in detail below. FIG. 2A is a graph showing the frequency characteristics of image blur prevention suppression ratios with the first and second gains. FIG. 2B is a graph showing the frequency characteristics of phase lags. A suppression ratio 26 based on the first gain is, for example, −20 dB near 1 Hz, i.e., 1/10 that without the image blur prevention function. That is, a sufficient image blur prevention effect is obtained. With this characteristic, when the camera is vibrated in synchronism with near 1 Hz to make a framing change, since the camera angular displacement for framing is also subjected to image blur prevention, similar to hand vibration, a desired framing change cannot be made.

In addition, with this characteristic, the photographer feels uncomfortable in using the camera when a framing change is made, as follows. Referring to FIG. 2B, with the first gain, the lag of a phase 28 is, for example, 60 deg or more near 1 Hz. With this lag, since a correction operation delays with respect to the displacement of the camera, the correction operation continues even after a framing change is completed. As a result, as an image moves in a direction opposite to the direction in which the frame change is made, although this phenomenon occurs for a moment after the completion of the framing change. The photographer therefore feels a sense of incongruity.

A suppression ratio 27 based on the second gain is, for example, −10 dB near 1 Hz, i.e., about 1/3 that without the image blur prevention function. That is, this image blur prevention effect is not sufficient. However, in making a framing change, when the camera is vibrated by 1 deg, a framing change of about 0.3 deg can be made. The photographer can actually feel the framing change. Since a phase 29 has almost no lag, displacement of an image in a direction opposite to the framing direction does not occur, unlike in the above case. Since the framing direction coincides with the phase of image displacement, the photographer does not feel a sense of incongruity.

When the photographer full-depresses the camera release switch 14 to perform exposure, the release switch 14 outputs a signal SW2. The signal SW2 is inputted to the timer means 19 to stop outputting the signals A and B. In addition, the signal SW2 sets the sample/hold circuit 114b in the hold mode, and connects the switch 11e to the terminal 11d so as to drive the correction optical means 16 with the first ratio again. The signal SW2 is inputted to an exposure means 18 to raise the mirror of the camera, perform shutter control (based on an AD output from the photographing preparation means 17), and perform exposure to a film.

During exposure, sufficient image blur prevention is performed with the first gain, and no degradation in image quality (caused by hand vibration) occurs on an image surface.

The function of the characteristic change compensate means 114 will be described below with reference to FIGS. 3A to 3D. Referring to FIG. 3A, actual hand vibration is represented by a sine wave.

Consider that the characteristic change compensate means 114 is not used, i.e., outputs from the first and second amplification circuits 11a and 11b are directly switched by the switch 11e. In this case, as shown in FIG. 3B, a target value inputted to the driving means 15 corresponds to the output from the second amplification circuit 11b in the ON state of SW1, and is switched to the output from the first amplification circuit 11b after SW2 is turned on. However, at this switching point, the target value becomes discontinuous. For this reason, at this time, the correction optical means 16 jumps to cause unwanted vibration. Since this vibration is caused immediately before exposure, degradation in image quality occurs.

The characteristic change compensate means 114 obtains the difference (a step amount δ in FIG. 3B) between the outputs from the first and second amplification circuits 11a and 11b at this switching point by using the differential circuit 114a, holds the difference by using the sample/hold circuit 114b, and outputs the difference between the signal from the sample/hold circuit 114b and the output from the first amplification circuit 11a by using the differential circuit 114c.

Since the step difference δ in FIG. 3B is subtracted from the output from the first amplification circuit 11a, the step difference is eliminated. As a result, as shown in FIG. 3C, the correction optical means 16 is driven in accordance with a continuous output before and after SW2 is turned on, thereby preventing the above unwanted image jump.

In the case shown in FIG. 3B, since the photographer can keep aiming at an object through the finder in the interval between the instant at which the release switch 14 is full-depressed (SW2) and the instant at which the mirror is raised, he/she feels uncomfortable seeing that a finer image is offset when SW2 is turned on. With the arrangement in FIG. 3C, the photographer does not have such an uncomfortable feeling.

Referring back to FIGS. 1A to 1C, an output from a ratio change inhibition means 111 is inputted to the switch 11e so that image blur prevention can be performed with the first ratio in accordance with an operation performed by the photographer even when SW1 is turned on.

When the photographer aims at an object and observes it, even slightly insufficient image blur prevention correction may make the observation of the object difficult. In such a case, the ratio change inhibition means 111 is used to perform image blur prevention with the first gain even when SW1 is turned on. Note that the signal SW1 is inputted to the ratio change inhibition means 111, and the ratio change inhibition means 111 is reset every time the signal SW1 is changed, thereby preventing failure to turn off the means 111.

An output from a second ratio adjustment means 112 is inputted to the second amplification circuit 11b so that the second gain can be changed in accordance with an operation performed by the photographer. This allows a change in characteristics corresponding to a framing change priority or image blur prevention priority in accordance with a photographing operation. A camera state detection means 113 detects the battery exhausted state and zoom focal length state of the camera. When the battery is exhausted or the focal length is short, the camera state detection means 113 outputs a signal to the second amplification circuit 11b to reduce the gain.

As the second gain is reduced, the driving amount of the correction optical means 16 is reduced. This means that the power consumption of the correction optical means 16 decreases. When the battery is greatly exhausted, the second gain is reduced to reduce the power consumption of the correction optical means 16 to decrease the speed at which the battery is exhausted.

When the zoom focal length is short, since hand vibration is not conspicuous on the finder, a relative image blur prevention effect before and after image blur prevention is small. In such a case, even if the second gain is reduced, the image blur prevention effect on the finder scarcely changes. For this reason, the second gain is reduced to reduce the driving amount of the correction optical means 16, thereby saving power.

When the hand vibration amount becomes larger than a predetermined amount, a fluctuation amount detection circuit 12c of the fluctuation detection means 12 outputs a signal to the second amplification circuit 11b to reduce the second gain so as to prevent the following inconveniences. When the hand vibration amount increases, the driving amount of the correction optical means 16 increases, resulting in an increase in power consumption. When large hand vibration occurs, the driving stroke of the correction optical means 16 reaches beyond its limit.

When the driving stroke of the correction optical means 16 reaches beyond its limit, the correction optical means 16 cannot move when SW2 is turned on, and hence can perform no image blur prevention. As a result, a deterioration in image quality occurs. With the above arrangement, when SW2 is turned on, the driving stroke of the correction optical means 16 falls within its limit, and hence sufficient image blur prevention can be performed when SW2 is turned on. When SW2 is turned on, since image blur prevention is performed with the first gain, the driving stroke of the correction optical means 16 may reach beyond its limit. In practice, however, the driving stroke of the correction optical means 16 rarely reaches beyond its limit in a very short time period for exposure.

A degree of stabilization detection circuit 12d observes the degree of stabilization of an output from the fluctuation detection means 12 (specifically an unstable output in the interval between the instant at which the fluctuation detection means 12 is started and the instant at which the means 12 is stabilized). More specifically, an output from the degree of stabilization detection circuit 12d is inputted to the switch 11e if the sensor output calculation circuit 12b keeps outputting a predetermined amount or more of output for a predetermined time period or more. At this time, the switch 11e is kept connected to the terminal 11c even after SW2 is turned on. This operation will be described below with reference to FIG. 4.

Referring to FIG. 4, with regard to an actual hand vibration amount 25 (expressed by a sine wave as in the case in FIG. 3), both an output 21 from the first amplification circuit 11a and an output 22 from the second amplification circuit 11b exhibit error curves rising obliquely rightward. These errors are unique errors caused when the sensor output calculation circuit 12b is started. With the second ratio, since the gain is small, the corresponding error is small accordingly.

With the first gain, as indicated by a waveform 24, an error remains in the image blur suppression amount on an image surface, although hand vibration is suppressed. With the second gain, as indicated by a waveform 23, the error is small, although slight hand vibration remains.

During an exposure time t, with the first gain, an error amount $\delta_1$ is obtained. With the second gain, an error amount $\delta_2$ is obtained. Note that, with the second gain, since the duration of an error $\delta_3$ occupies most ($t_2$) of the exposure time t, an actual error appearing on a film is slightly larger in amount than the error $\delta_3$ and smaller than the error amount $\delta_1$. That is, while an output from the fluctuation detection means 12 is unstable, image blur prevention with the second gain suppresses degradation in image quality.

In such a case, therefore, the degree of stabilization detection circuit 12d outputs a signal, and a photographing operation is performed while image blur prevention is performed with the second gain even when SW2 is turned on.

Figure 11:
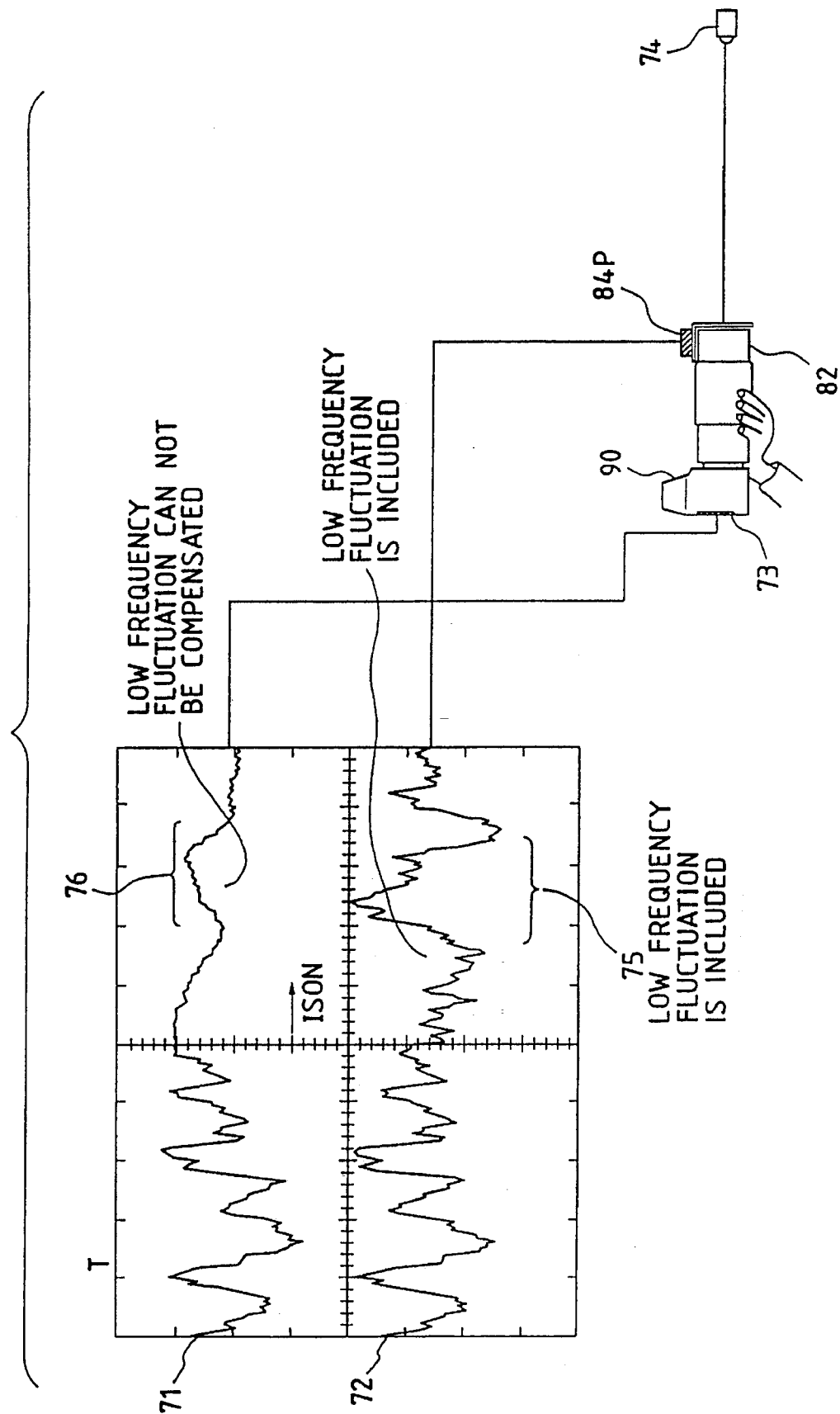
FIG. 11 is a graph for explaining problems in a conventional image blur prevention apparatus.
Figure 12:
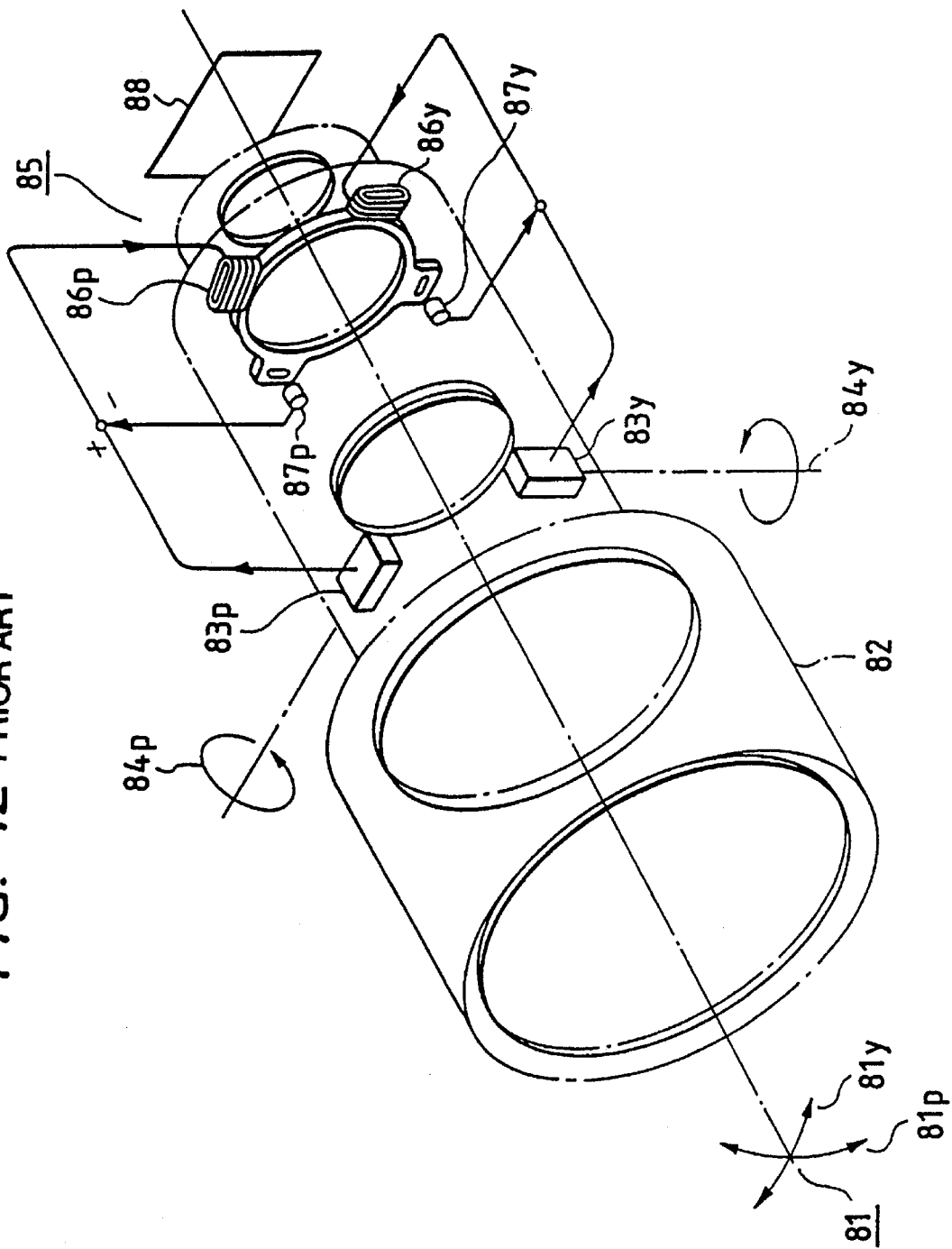
FIG. 12 is a perspective view showing the arrangement of the main part of the conventional image blur prevention apparatus.

FIG. 5 shows the effect of the above system. Similar to the case in FIG. 11, when actual fluctuation is compared with fluctuation 32 on an image surface, it is found that both the fluctuation 31 and the fluctuation 32 exhibit the same output before SW1 is turned on, hand vibration is considerably suppressed after SW1 is turned on, and no hand vibration remains after SW2 is turned on. Referring to FIG. 5, the time for observation is long after SW2 is turned on. In practice, however, this time is short during exposure, and there is no image blur prevention degradation 33 which is caused by large fluctuation having a low frequency a few seconds after SW2 is turned on.

Figure 6B:
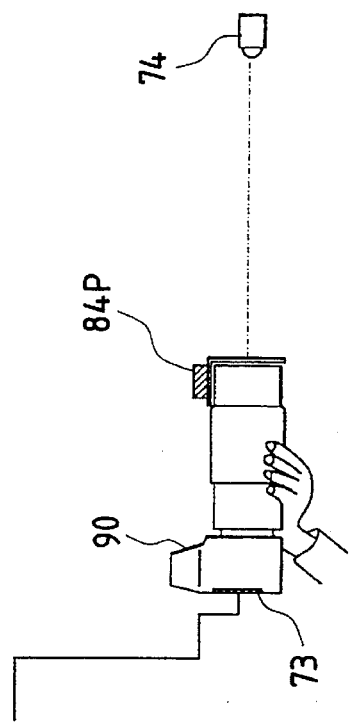
FIGS. 6A and 6B are views for explaining the effect obtained by the arrangement of the first embodiment of the present invention.
Figure 6A:
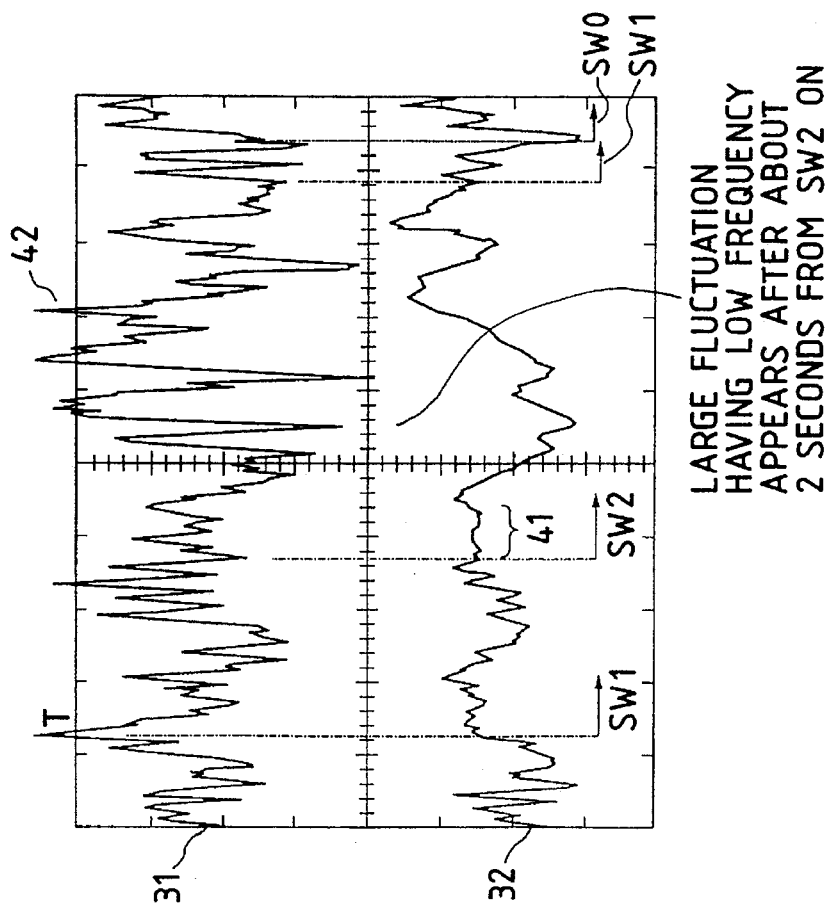

Referring to FIG. 5, the fluctuation on the image surface becomes discontinuous when SW2 is turned on. This is because the characteristic change compensate means 114 is not used. If the characteristic change compensate means 114 is used as in the case in FIG. 6, such discontinuity can be eliminated when SW2 is turned The photographer in FIG. 5 is different from the photographer in FIGS. 6A and 6B. Referring to FIGS. 6A and 6B, the photographer generates large fluctuation 42 having a low frequency after SW2 is turned on. However, when SW1 is turned on, no large fluctuation is caused, and sufficient image blur prevention is performed in an exposure interval 41.

As described above, this system allows even a photographer who generates large fluctuation in performing image blur prevention to perform a photographing operation without degradation in image quality due to fluctuation during exposure. In addition, the system realizes power saving and allows a framing change.

In this embodiment in which the present invention is applied to a silver halide film camera, as described above, the first and second gains are selectively used depending on whether SW1 or SW2 is turned on. However, when the present invention is applied to a video camera, the first gain is used during a recording operation, and the second gain is used in a state wherein no recording operation is performed although imaging is performed to display an image in the finder (e.g., in the standby or pause mode).

[Second Embodiment]

Figure 7A:
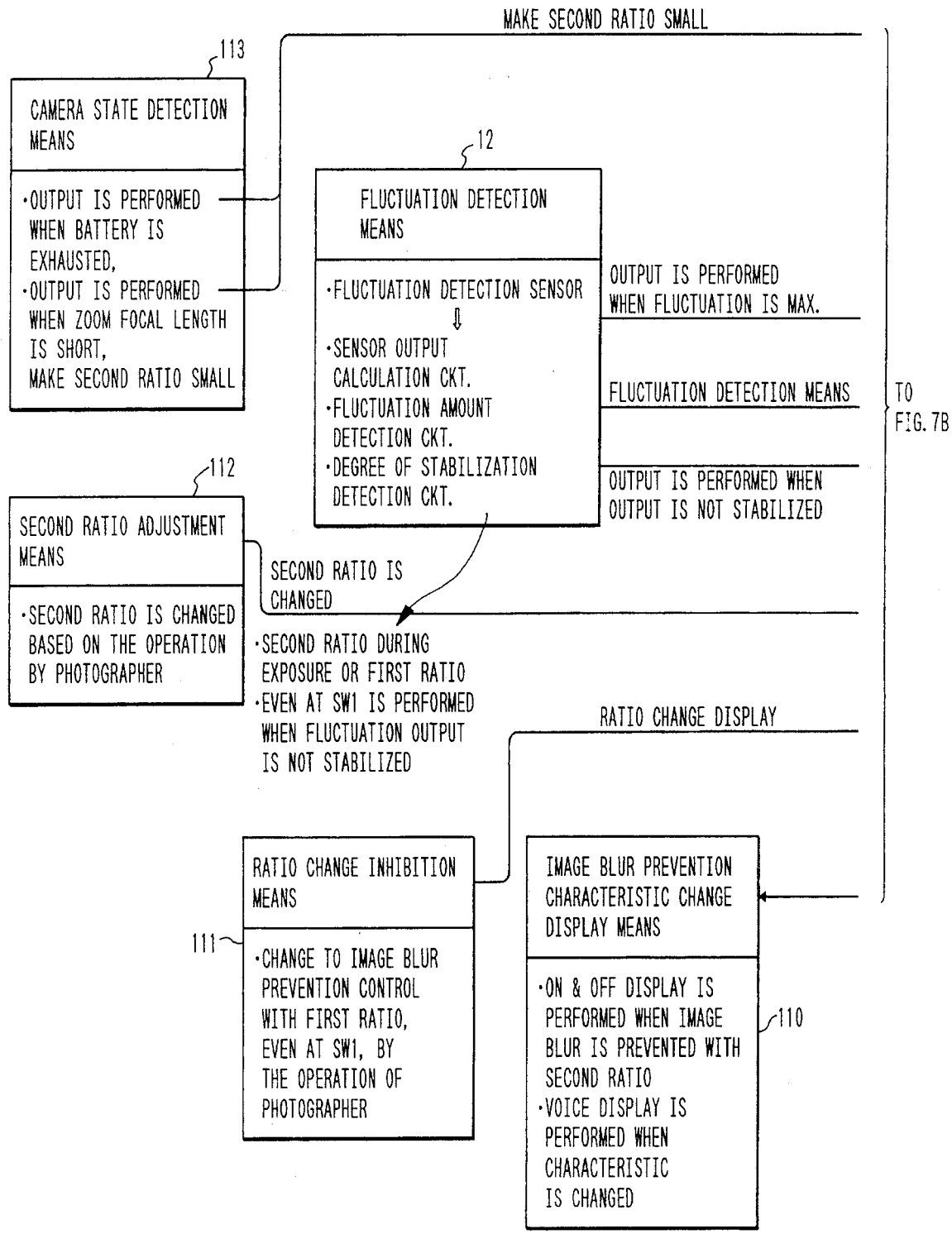
FIG. 7 is comprised of FIGS. 7A, 7B and 7C illustrating block diagrams showing the schematic arrangement of the second embodiment of the present invention.
Figure 7B:
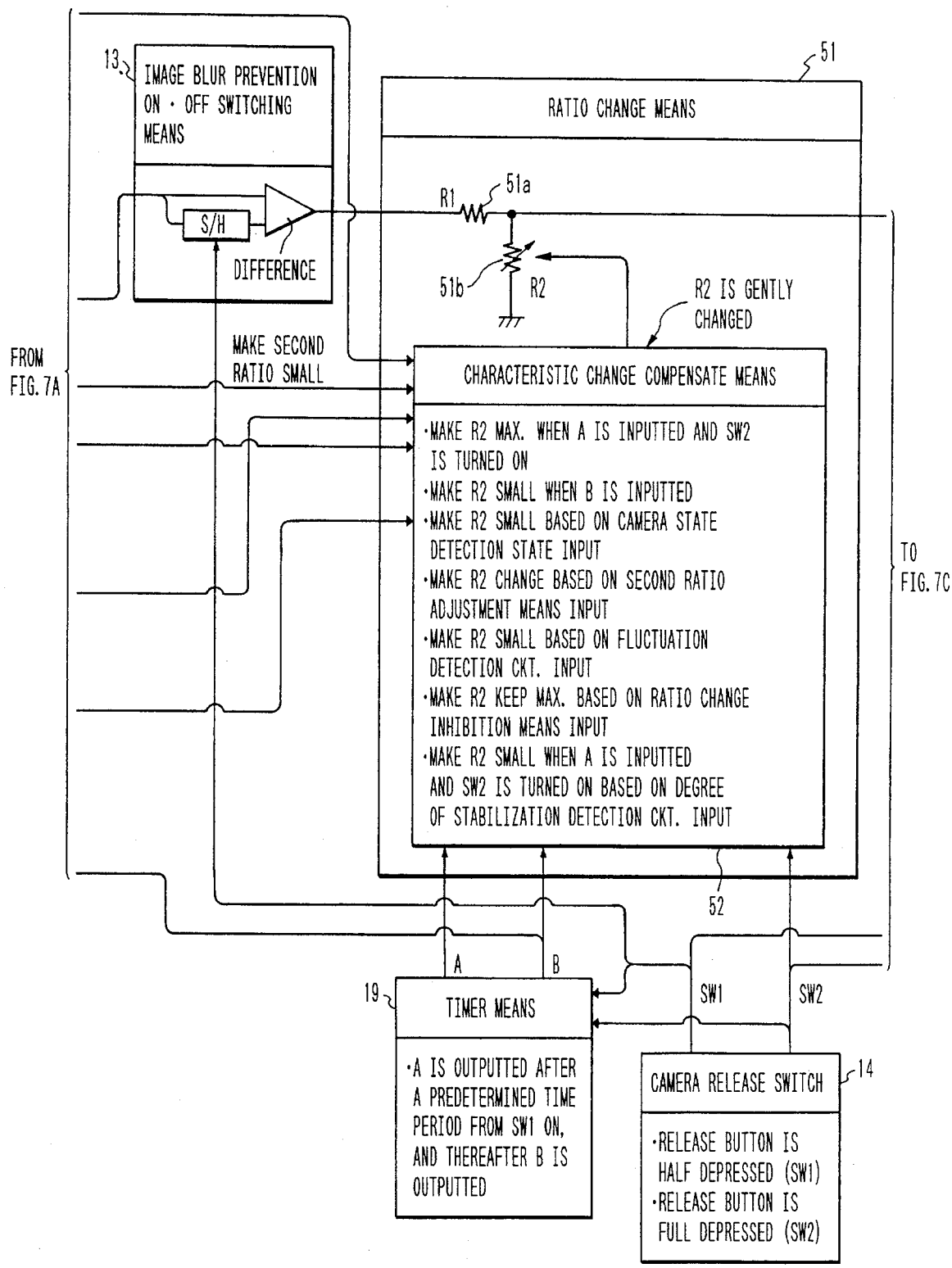
Figure 7C:
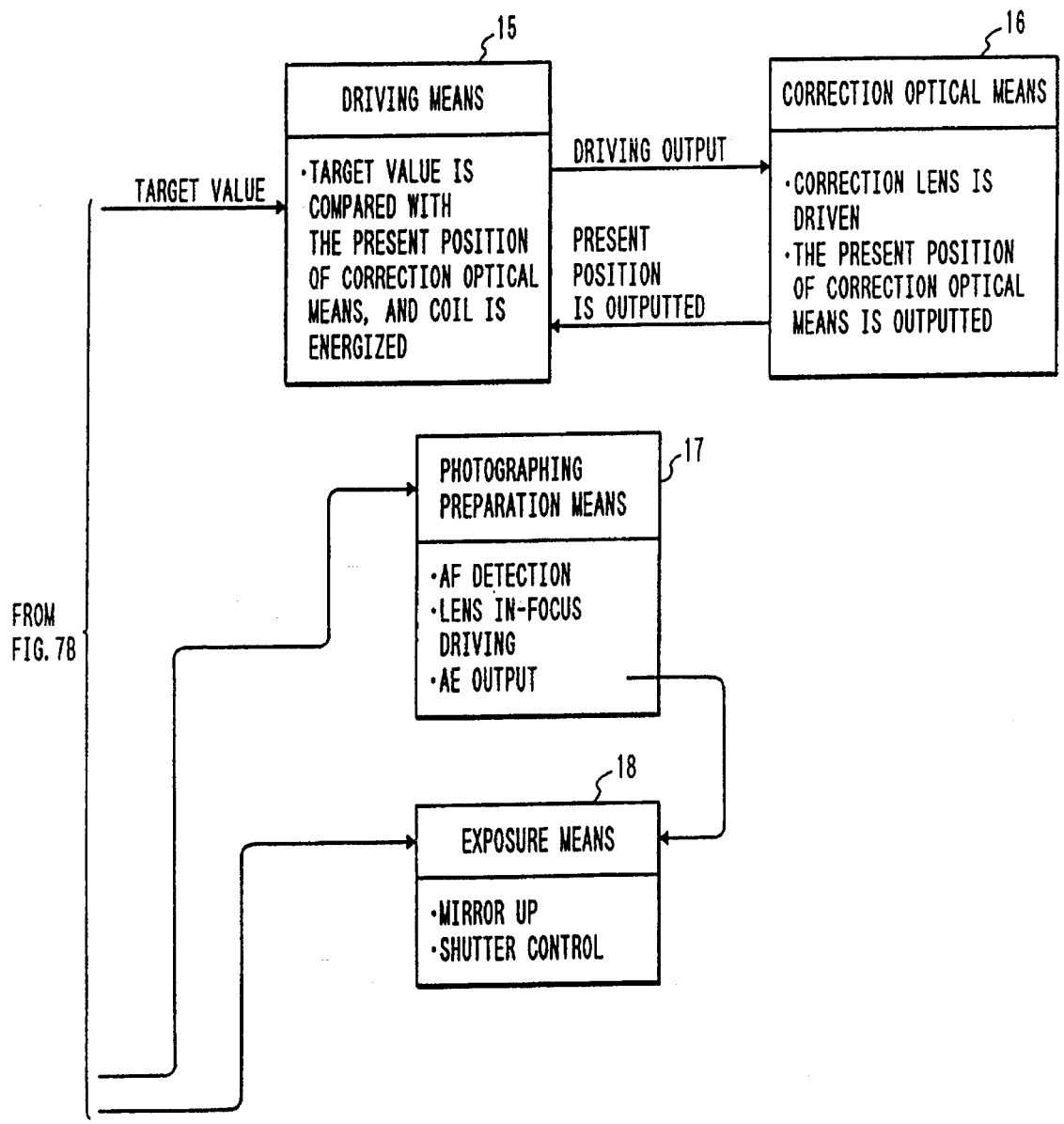

FIGS. 7A to 7C show the second embodiment of the present invention. The arrangement in FIGS. 7A to 7C are different from that in FIGS. 1A to 1C in the contents of a ratio change means 51, and a characteristic change compensate means 52. The ratio change means 51 is constituted by a resistor 51a having a resistance $R_1$ and a variable resistor 51b whose resistance $R_2$ is variable. When the resistance $R_2$ is increased, a target value becomes the first gain. When the resistance $R_2$ is decreased, the target value becomes the second gain.

The resistance $R_2$ is relatively gradually changed to make the target value continuously change from the second gain to the first gain. If the resistance $R_2$ is changed instantly, the target value changes discontinuously from the second gain to the first gain, thus causing discontinuity as in the case in FIG. 3B when SW2 is turned on. However, if this change is gradually made, the target value changes continuously from the second gain to the first gain as in the case in FIG. 3D when SW2 is turned on.

The characteristic change compensate means 52 controls a change in the resistance $R_2$. Assume that the target value is to be changed from the second gain to the first gain when SW2' is turned on, as shown in FIG. 3D. In this case, if the target value itself is small, and even an instant change in the resistance $R_2$ causes no large discontinuity, the resistance $R_2$ is changed instantly to quickly change the target value from the second gain to the first gain.

The characteristic change compensate means 52 also controls a change in the resistance $R_2$ in the following cases, similar to control of the second gain in FIGS. 1A to 1C.

(i) The resistance $R_2$ is maximized (the first gain) in an early stage (when a signal A is inputted) after SW1 is turned on or when SW2 is turned on.

(ii) The resistance $R_2$ is decreased (the second gain) in the interval between the instant upon the lapse of a few seconds (a signal B is input) after SW1 is turned on and the instant at which SW2 is turned on.

(iii) The resistance $R_2$ is further decreased (smaller than the second gain) when the battery is exhausted or the zoom focal length is short (when an output from the camera state detection means is inputted).

(iv) The resistance $R_2$ is changed (the second gain is changed) in accordance with a request from the photographer (when an output from the second ratio adjustment means is inputted).

(v) The resistance $R_2$ is further decreased (the second gain is further decreased) when large hand vibration occurs (when an output from the fluctuation amount detection circuit is inputted).

(vi) The resistance $R_2$ is fixed to the maximum value (the first gain) in accordance with a request from the photographer (when an output from the ratio change inhibition means is inputted).

(vii) The resistance $R_2$ is decreased (to the second gain) when an output from the fluctuation detection means is unstable (when an output from the degree of stabilization detection circuit is inputted), in an early stage after SW1 is turned on, or when SW2 is turned on.

In case (vii), the first gain or a gain larger than the first gain may be set in an early stage after SW1 is turned on to allow the photographer to see image fluctuation in the finder so as to notify him/her that an output from the fluctuation detection means is unstable.

With the above arrangement, the circuit sizes of the ratio change means and the characteristic change compensate means are smaller than those in the arrangement in FIGS. 1A to 1C, thereby attaining a reduction in the size of the apparatus and a reduction in the power consumption of each circuit.

In both the first and second embodiments, the problems in the conventional apparatuses are solved by changing the ratio. The control method for the arrangements in FIGS. 1 and 7 is not limited to this. For example, the sensor output calculation circuit 12b (specifically an integration circuit for a sensor output) of the fluctuation detection sensor 12a may be controlled in the above method. Note that the sensor output calculation circuit 12b includes an integration circuit for integrating an output from the fluctuation detection sensor 12a.

The function of this integration circuit will be described below. When an angular velocity meter is used as a fluctuation detection sensor, integration must be performed once to obtain a fluctuation angle from a fluctuation angular velocity. FIG. 8A is a Bode diagram showing the characteristics of the integration circuit in this integration process, in which the abscissa represents the frequency; and the ordinate, the gain (attenuation ratio). An alternate long and short dashed line 66 represents an integration circuit having an integration characteristic for integration of 0.1 Hz or more (corresponding to a portion exhibiting a decrease in gain with an increase in frequency). When an image blur prevention system free from degradation in image quality is to be constructed by faithfully integrating a hand vibration band of 1 Hz to 12 Hz, the integration circuit having the characteristics represented by the alternate long and short dashed line 66 is required for at least an exposure process. Referring to FIG. 8A, a hand vibration angle output 611 is obtained by integrating an output from the fluctuation detection sensor in this case. A solid line 67 represents the characteristics of an integration circuit in which the time constant of the integrator is set to be small (for integration of 0.2 Hz or more). In this case, since the fluctuation detection sensor output is slightly degraded by the integration circuit, degradation in image quality is caused by fluctuation in the exposure process. However, when the photographer is aiming at an object through the finder (i.e., while SW1 is ON), no significant problem is posed. The amplitude of the low-frequency component of a hand vibration angle output 612 is smaller than that of the hand vibration angle output 611. This is because the alternate long and short dashed line 66 and the solid line 67 exhibit different gains at 1 Hz or lower, as indicated by $G_1(69)$ in FIG. 8A. As is apparent, if the integration time constant is decreased (characteristics for integration of $f_0$ or more), the amplitude of the low-frequency component is decreased.

Note that since the hand vibration band is 1 Hz to 12 Hz, the amplitude difference in FIG. 8B (i.e., the amplitude difference near 0.1 Hz) may not be caused. However, actual hand vibration includes such a low-frequency component (which causes no degradation in image quality in a short interval for exposure because it has a very low frequency, and hence has been neglected), and the fluctuation detection sensor also includes such a low-frequency error output. For this reason, an amplitude difference like the one shown in FIG. 8B appears.

That is, the driving stroke of the correction optical means can be controlled by changing the time constant of the integration circuit. Therefore, the problems in the conventional apparatuses may be solved by changing the time constant of the integration circuit instead of changing the ratio as in FIGS. 7A to 7C. Such a case will be described below.

Figure 9A:
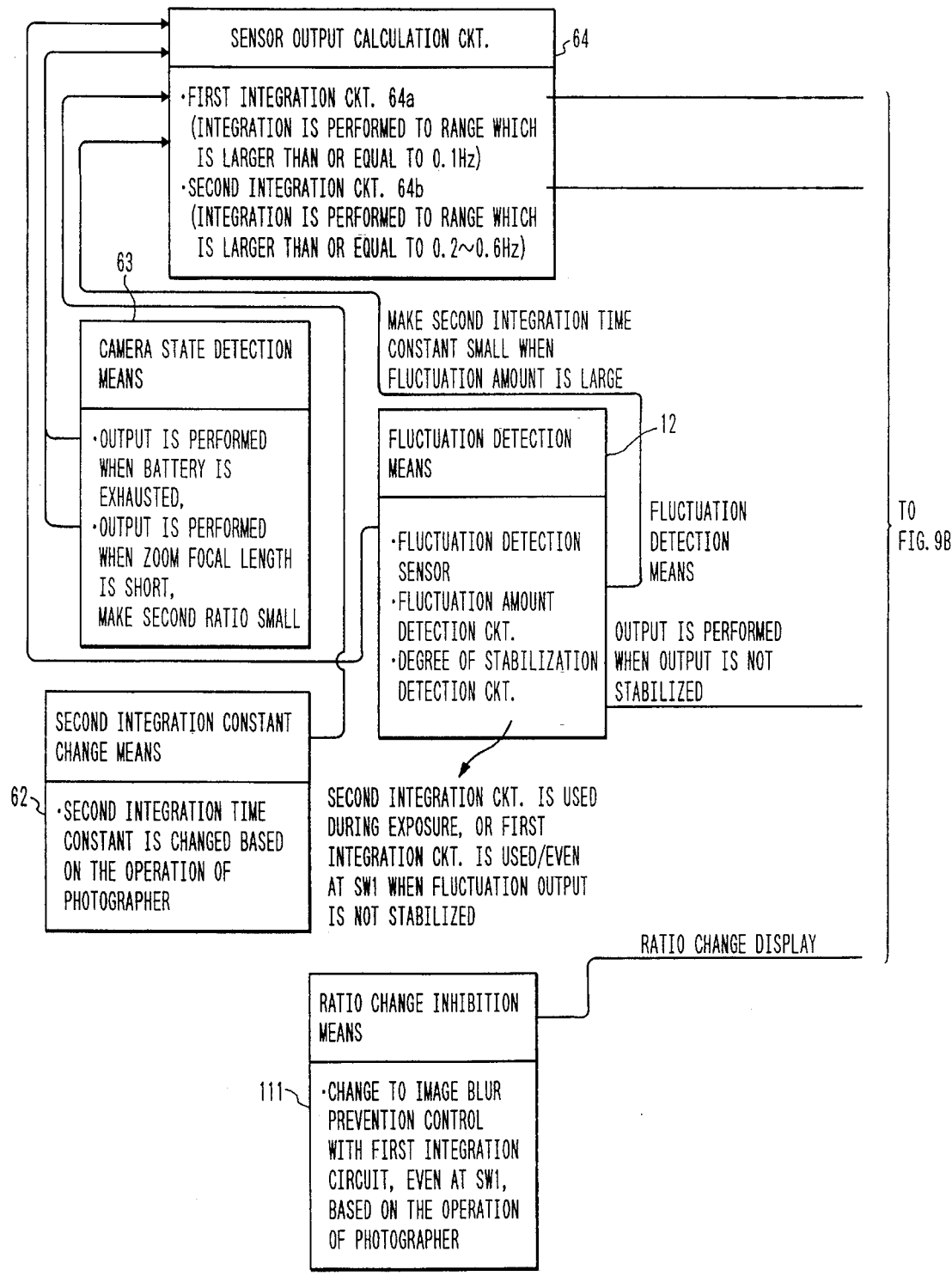
FIG. 9 is comprised of FIGS. 9A, 9B and 9C illustrating block diagrams showing the schematic arrangement of the third embodiment of the present invention.
Figure 9B:
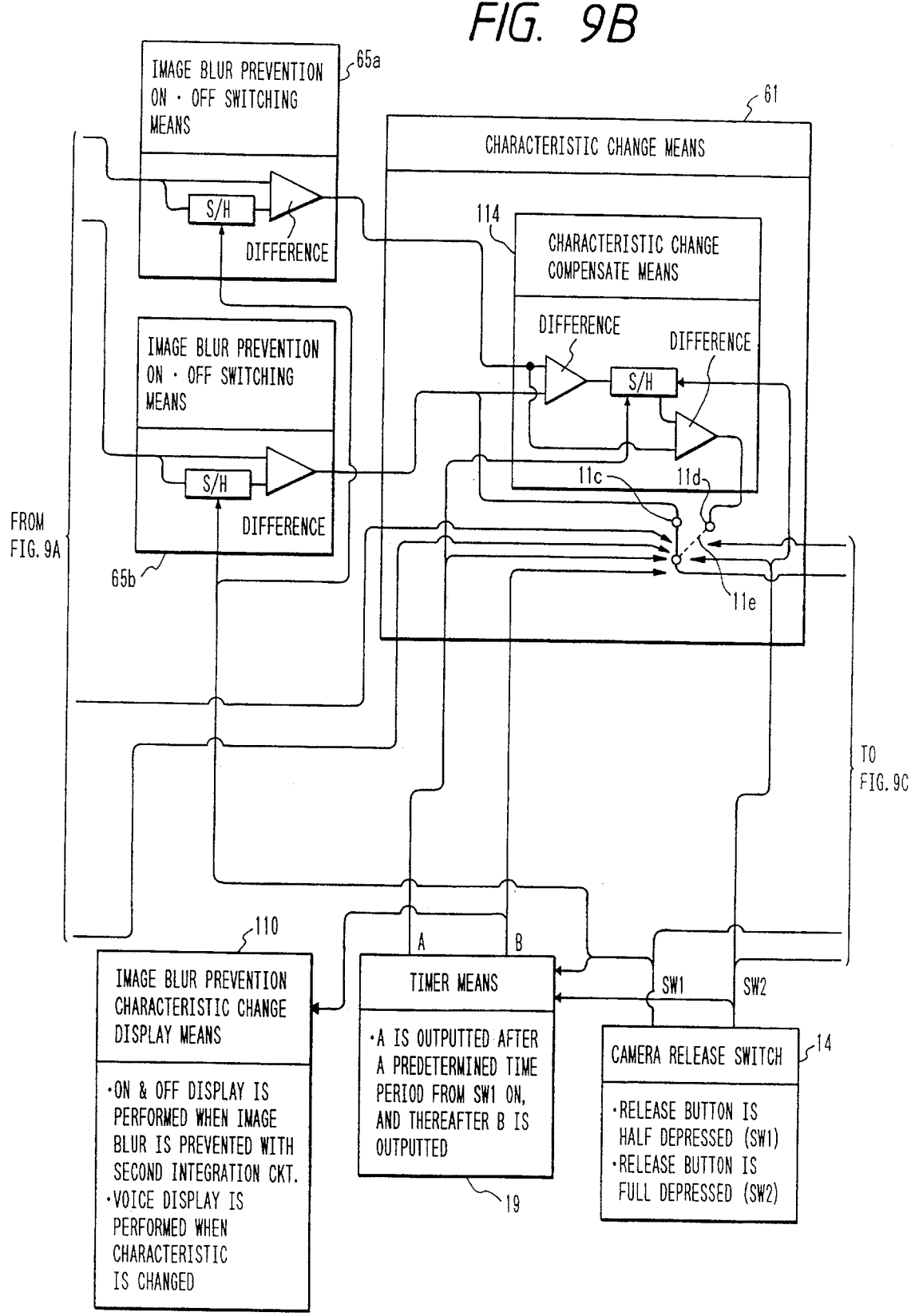
Figure 9C:
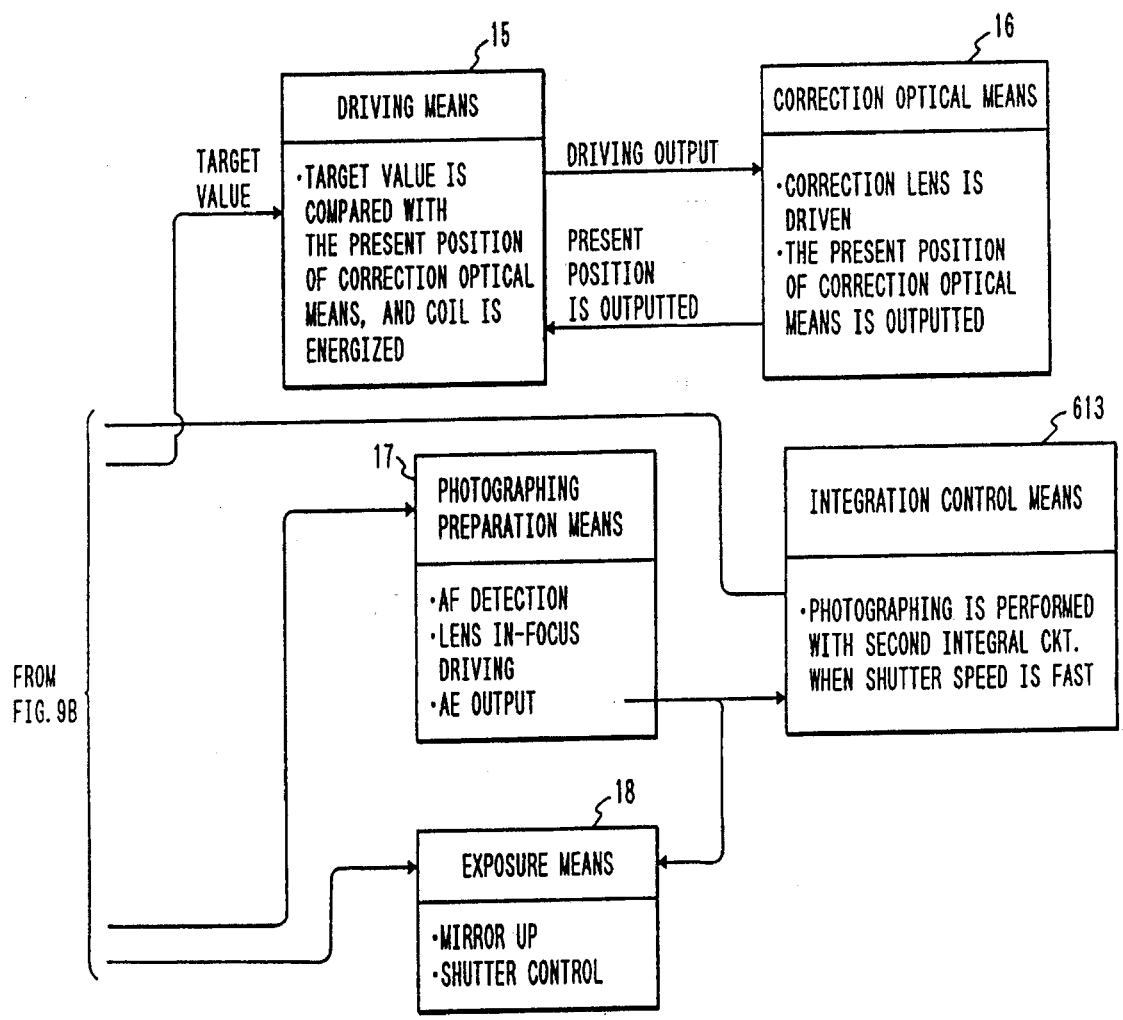

FIGS. 9A to 9C show the third embodiment of the present invention. The arrangement in FIGS. 9A to 9C are different from that in FIGS. 1A to 1C in that the first and second amplification circuits 11a and 11b are replaced with first and second integration circuits 64a and 64b in a sensor output calculation circuit 64.

Referring to FIGS. 9A to 9C, for the sake of easy understanding, a sensor output calculation circuit 64 is indicated by a block different from that of a fluctuation detection means 12. The sensor output calculation circuit 64 has the first integration circuit 64a having a large time constant and serving to perform integration of 1 Hz or more, and the second integration circuit 64b having a small time constant and serving to perform integration of 0.2 Hz or more. Both the integration circuits integrate an output from a fluctuation detection sensor (angular velocity meter) to obtain fluctuation angles.

These two outputs are inputted to a characteristic change means 61 through image blur prevention ON-OFF switching means 65a and 65b (having the same function as that of the image blur prevention ON-OFF switching means 13 in FIG. 1B), and the characteristics of a target value are switched by terminals 11c and 11d and a switch 1e. Since control of the switch 11e and the operation of a characteristic change compensate means 114 are the same as those in FIGS. 1A to 1C, a description thereof will be omitted.

While image blur prevention is performed by the second integration circuit 64b, an image blur prevention characteristic change display means 110 displays information indicating that a fine framing change can be made. A ratio change inhibition means 111 fixes the switch 11e to the terminal 11d to always perform image blur prevention by using the first integration circuit 64a. A second integration time constant change means 62 changes the integration time constant of the second integration circuit 64b to a desired value in accordance with an operation performed by the photographer. That is, the function of the second integration time constant change means 62 is similar to that of the second ratio adjustment means 112 in FIG. 1A.

A camera state detection means 63 decreases the time constant of the second integration circuit 64b to save power when the battery is exhausted or the zoom focal length is short, similar to the camera state detection means 113 in FIG. 1A.

An integration control means 613 connects the switch 11e to the terminal 11c to perform exposure by using the second integration circuit 64b when receiving a shutter speed information input indicating a high shutter speed from a photographing preparation means 17.

This operation is performed for the following reason. When the shutter speed is high, even if the image blur prevention precision is slightly degraded as in the second integration circuit, this degradation is degradation in the low-frequency component of hand vibration. Almost no degradation in image quality therefore occurs because of a short exposure time. As described above, although the first integration circuit sufficiently performs image blur prevention, the circuit faithfully reproduces an error component superposed on an output from the hand vibration detection sensor as well. The second integration circuit has low image blur prevention precision but produces only a small error component. For this reason, the second integration circuit is effective in a short exposure time. In addition, power can be saved. When the shutter speed is high, therefore, exposure is performed by using the second integration circuit.

Furthermore, the integration control means 613 is designed to perform exposure by using the second integration circuit even when the shutter speed is very low (e.g., ½ second). This is because an error component (very low-frequency component) superposed on an output from the first integration circuit is larger than that superposed on an output from the second integration circuit by $G_1(69)$ in FIG. 8B. This error component becomes noticeable at a very low shutter speed because of the very low frequency. In such a case, therefore, exposure is performed by using the second integration circuit with a small error component even with degradation in image blur prevention precision.

Figure 10:
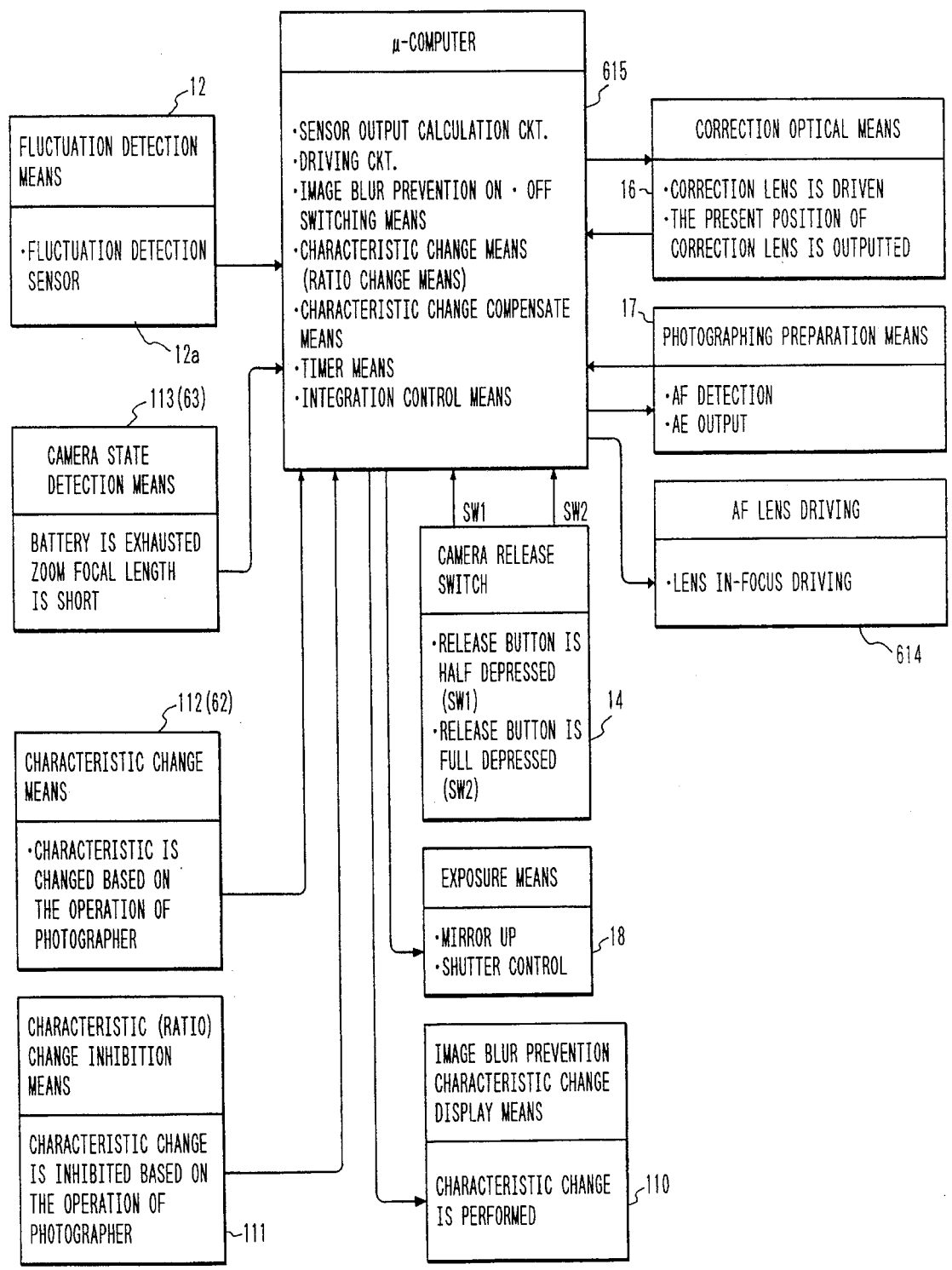
FIG. 10 is a block diagram showing the schematic arrangement of the fourth embodiment of the present invention.

In the embodiments shown in FIGS. 1 to 10, as is apparent, when, for example, the zoom focal length of an image blur prevention lens changes, or the focal length changes from infinity to closest focusing distance, the suppression ratio on an image surface with respect to a hand vibration amount (i.e., the driving amount of the correction optical means) must be changed. However, this operation is not directly associated with the gist of the present invention, and hence is omitted from FIGS. 1A to 6B. For the sake of easy understanding of the present invention, FIG. 1A to FIG. 6B show the embodiment using the analog circuit. However, as shown in FIG. 10, an output from the fluctuation detection sensor 12a may be A/D-converted to be loaded in a μ-computer 615 in a camera or a lens, and the μ-computer may sequentially output a sensor output calculation output, an image blur prevention ON-OFF switching output, and a driving circuit output to the correction optical means 16 in the order named to drive the correction optical means 16, thereby performing image blur prevention. In this manner, in the μ-computer 615, a characteristic (ratio) change and characteristic change compensation (for realizing continuity before and after a change is made) may be performed all together.

In each embodiment described above, the means for performing displacement control is designed to change the gain of a signal corresponding to an image blur displacement amount. However, a means for performing velocity or acceleration control may be used. For example, such a means may be designed to change the gain of a velocity or acceleration signal.

In the present invention, the arrangements or some arrangements of the claims or the embodiments may be incorporated in different apparatuses. For example, the blur detection unit may be incorporated in the camera body; the blur correction unit, in the lens barrel mounted on the camera; and the control unit for controlling these units, in an intermediate adaptor.

According to the present invention, as blur detection means, any means can be used as long as it can detect a blur, e.g., an angular acceleration meter, an acceleration meter, an angular velocity meter, a speedometer, an angular displacement meter, a displacement meter, or a method of detecting an image blur itself.

According to the present invention, as blur prevention means, any means can be used as long as it can prevent a blur, e.g., a shift optical system for moving an optical member within a plane perpendicular to the optical axis, beam change means such as a variable angle prism, means for moving a photographic plane within a plane perpendicular to the optical axis, or means for correcting a blur by image processing.

The present invention can be applied to a lens shutter camera, a video camera, optical equipment other than cameras, and other apparatuses in addition to a single-lens reflex camera. The present invention can also be used as a constituent unit.

In addition, the respective embodiments or their technical elements may be combined as needed.

The present invention may be one apparatus constituted by all or some of constituent elements of the appended claims or the arrangements of the preferred embodiments, an apparatus coupled to another apparatus, or an element constituting an apparatus.

Furthermore, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

What is claimed is:

1. An apparatus adapted to an image blur prevention apparatus, comprising:

a control unit for performing control to switch operations between a first image blur prevention operation and a second image blur prevention operation with respect to the same image blur state in accordance with a start of a photographing operation, said control unit switching the operations independently of an image blur frequency.

2. An apparatus according to claim 1, wherein the image blur prevention apparatus performs image blur prevention by correcting an image blur, and said control unit includes means for switching operations between a first image blur correction operation and a second image blur correction operation.

3. An apparatus according to claim 2, wherein said control unit includes means for changing an image blur correction amount with respect to the same image blur state depending on whether the first or second image blur correction operation is performed.

4. An apparatus according to claim 2, wherein said control unit includes means for switching modes between a first image blur correction mode of substantially performing correction by an operation amount required to correct an image blur, and a second image blur correction mode of performing correction by an operation amount smaller than the required operation amount.

5. An apparatus according to claim 4, wherein said control apparatus includes means for performing the first image blur correction mode before a photographing operation is started, and performing the second image blur correction mode while a photographing operation is performed.

6. An apparatus according to claim 1, wherein said control unit includes means for performing the switching operation in accordance with an operational state of an operation portion for performing a photographing operation.

7. An apparatus according to claim 1, wherein the image blur prevention apparatus performs image blur prevention in accordance with a signal corresponding to an image blur state, and said control unit includes means for changing an operation of the image blur prevention apparatus by changing a manner of responding to a signal corresponding to the same image blur state.

8. An apparatus according to claim 7, wherein the image blur prevention apparatus performs image blur prevention in accordance with a signal amplified by amplification means for amplifying a signal corresponding to the image blur state, and said control unit includes means for changing an operation of the image blur prevention apparatus by changing a degree of amplification of the amplification means.

9. An image blur prevention apparatus comprising:

image blur prevention means for preventing an image blur; and a control unit for performing control to switch operations between a first image blur prevention operation and a second image blur prevention operation with respect to the same image blur state in accordance with a start of a photographing operation, said control unit switching the operations independently of an image blur frequency.

10. An optical equipment to which an image blur prevention apparatus is applied, comprising:

a control unit for performing control to switch operations between a first image blur prevention operation and a second image blur prevention operation with respect to the same image blur state in accordance with a start of a photography operation, said control unit switching the operations independently of an image blur frequency.

11. A camera to which an image blur prevention apparatus is applied, comprising:

a control unit for performing control to switch operations between a first image blur prevention operation and a second image blur prevention operation with respect to the same image blur state in accordance with a start of a photographing operation, said control unit switching the operations independently of an image blur frequency.

* * * * *